United States Patent [19]

Schilf et al.

[11] 4,390,275
[45] Jun. 28, 1983

[54] MEASURING MINUTE, LOCAL TEMPERATURE DIFFERENCES

[75] Inventors: Lothar Schilf, Achim; Ingo H. Giese, Bremen, both of Fed. Rep. of Germany

[73] Assignee: Erno-Raumfahrttechnik GmbH, Bremen, Fed. Rep. of Germany

[21] Appl. No.: 216,182

[22] Filed: Dec. 15, 1980

[30] Foreign Application Priority Data

Dec. 13, 1979 [DE] Fed. Rep. of Germany ....... 2950047

[51] Int. Cl.³ .......................... G01J 5/00; G02F 1/13
[52] U.S. Cl. ...................... 356/43; 350/535; 350/334; 350/351; 374/162
[58] Field of Search .......................... 356/43; 73/356; 250/331; 350/92, 93, 351, 334

[56] References Cited

U.S. PATENT DOCUMENTS 3,114,836 12/1963 Fergason et al. ...................... 73/356
3,770,961 11/1973 Westell ................. 250/331
3,796,884 3/1974 Tricoire ................. 350/351

FOREIGN PATENT DOCUMENTS 1442802 7/1976 United Kingdom ................. 73/356

*Primary Examiner*—Vincent P. McGraw
*Attorney, Agent, or Firm*—Ralf Siegemund

[57] ABSTRACT

An object carrier has a transparent plate with an opaque backing and carries a thin liquid crystal layer which, in turn, is covered with a 2 μm glass plate carrying an object (microorganism, etc.). This carrier is placed in a microscope for photographic observation of the temperature-dependent reflectivity of the crystal layer as heat conductively coupled to the object. The average reflection of light by the crystal layer is used as a representation of its average temperature, to control backlighting of the opaque layer to, thereby, stabilize the average object temperature to at least $10^{-3}$ degrees centigrade.

16 Claims, 6 Drawing Figures

MEASURING MINUTE, LOCAL TEMPERATURE DIFFERENCES

BACKGROUND OF THE INVENTION

The present invention relates broadly to the measuring field of minute temperature differences.

Thermographic investigations and tests are usually carried out by means of infrared microscopes, for particularly measuring microtemperature differences at a resolution of 0.1° C. and at a spatial resolution of about 15 micrometers.

Small, local temperature differences are to be ascertained, for example, in the field called microbiology, particularly for purposes of medical research or diagnostics. In particular, it is desirable to ascertain metabolic processes in living cells, if these processes are accompanied by temperature changes. Conducting tests on living cells has many advantages over procedures, such as dyeing, which lead to the death of the cells. Thermographic investigations are of particular interest, for example, for diagnosing cancer because it is known that cells suspected of concerous abnormalities exhibit a different metobolism as compared with normal cells and these differences reflect differences in the accompanying temperature changes.

The total energy being converted in metabolic processes of an organism can be divided into a resting energy conversion and energy conversion due to motion. Both energy quantities are extracted from the cells by means of biochemical reactors. Part of the energy is used for the generation of new cells and their components, another portion is transmitted to the immediate environment. Thermographic investigations must lead to the detection of that local heat transfer into the environment.

It can readily be seen that detection of local temperature differences in an organism depends critically upon maintaining the temperature of that organism constant as far as creating a suitable environment for the measurement of local temperature differences is concerned. The thermographic or thermometric investigation is to be carried out by means of a conventional microscope under utilization of still- or motion picture or TV cameras. The invention is specifically concerned with these measurements as well as high the generation of an adequately stabile, thermal environment for such measurements.

It is an object of the present invention to improve the thermometric or thermographic measurement of minute local temperature differences in an object. It is a further object of the present invention to improve such measurements by specifically stabilizing the thermal environment for such an object.

It is another object of the present invention to improve microscopes used for measuring minute temperature differences.

It is a somewhat broader object of the present invention to improve the environment of, for, and in such microscopes as far as the temperature and its control of the object under investigation is concerned.

It is a specific object of the present invention to improve such microscopes being provided, e.g., with an object carrier table that is heatable.

It is another specific object of the present invention to improve microbiological investigations.

In accordance with the preferred embodiment of the present invention, it is suggested to use an object carrier for such thermographic or thermometric investigations which includes an embedded layer of a liquid crystal material, whereby the object-carrying cover for that material is to be very thin, preferably in the order of a few micrometers for assuring good thermal and heat-conductive contact between the crystal layer and the object. The invention makes use of the known fact that liquid crystals with a helical molecular structure exhibit a temperature-selective reflection which is highly localized at a resolution of below $10^{-2}$ centigrades at a spatial resolution of about 200 Angstroms, and a temporal resolution of about 33 cycles per second. Such an object carrier is, indeed, well suited for detecting local temperature differences.

As far as the environmental thermal stabilization is concerned, it is suggested that this carrier be provided with a light-absorbing bottom, to be exposed to a controllable source of radiation. The total reflection of the carrier as established primarily by the liquid crystal layer is ascertained to, thereby, measure its average temperature (including the temperature of the object), and to control the above-mentioned light source (e.g., through a diaphragm or the like) to, thereby, stabilize the average temperature. Temperature stabilization in the order of $10^{-3}$ centigrades or better can be achieved in this manner.

It can, thus, be seen that the novel carrier performs two functions. First of all, it operates as the temperature detector for the object under investigation. The liquid crystal responds locally to local, thermal differences by changing its reflectivity to, thereby, indicate temperature changes in the adjacent object (e.g., a cell or microorganism). In addition, it keeps its average temperature constant to, thereby, stabilize the thermal environment for the object it carries so that, e.g., local cell activity can, indeed, be traced by the variation in temperature on account of that activity and for no other reason.

It was found that unter utilization of an otherwise regular thermometric microscope, temperature differences of less than $10^{-2}$ centigrades at distances smaller than one micrometer can be detected. The accuracy depends to some extent upon the liquid crystal material; cholesteric liquid crystals are highly satisfactory. This is an improvement by more than one order of magnitude. Also, short-term temperature variations can be detected better than before.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

Proceeding now to the detailed description of the drawings, FIG. 1 illustrates an objective lens or lens system 1 for a microscope and being optically aligned with a tube lens 2, a ray divider 3 and an eyepiece 4. The ray divider 3 directs a portion of the light rays arriving from lens 2 toward a photographic registration device which includes a camera-objective lens 5 and a camera proper, 6. This camera is the principal input device for the measurement. It could be a still camera or a movie camera, or a TV camera.

Figure 1:
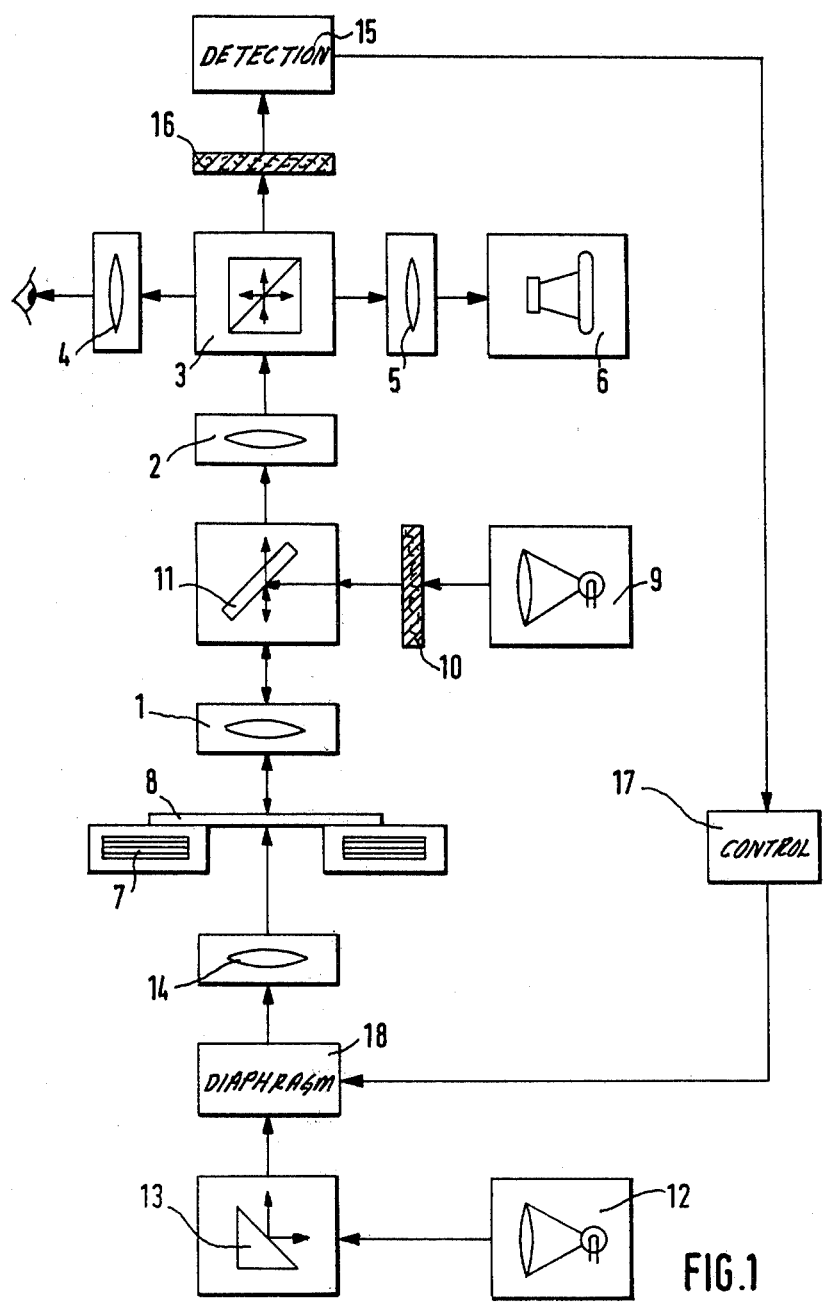
FIG. 1 is a schematic representation of a microscope and associated parts in accordance with the preferred embodiment of the present invention for practicing the best mode thereof.

The microscope equipment includes a heated table 7 supporting an object carrier 8 in a manner which does not interfer with the illumination of the object. Transillumination is provided by a source 12 via a redirecting mirror 13 and a condensor lens 14. However, in the present arrangement, this light source serves a different purpose than is normally the case in microscopes having such a feature. Direct illumination is provided by a source 9 via a heat filter 10 and a partial or semi-reflector 11 being disposed in the principal ray's path. These elements provide for direct illumination of an object and its carrier from the side "seen" by the camera.

A light detector 15 is provided to receive a portion of the rays permitted to pass the divider 3, there being an edge filter 16 interposed. The detector 15 responds to the overall illumination brightness as returned by the camera 8, or a central portion thereof, which includes the object and operates a control device 17 which, in turn, adjusts a diaphragm 18 being disposed downstream from the source 12 but ahead of the object. Source 12 is a constant radiation source, but illumination of the back of carrier 8 is adjustable by the device 18. This device may be a mechanical diaphragm or a combination of polarization filters movable relative to each other or any other suitable light value.

In operation, object carrier 8 on heated table 7 is maintained therewith at a constant temperature at a tolerance not exceeding 0.1° C. The liquid crystal in carrier 8 reacts to any (particularly smaller) temperature changes of the carrier by changing its reflectivity. Assuming source 9 to be on (direct illumination), detector 15 will receive an intensity that varies with any changes in reflection, i.e., temperature of the carrier 8 and of any object thereon. If the source 12 is likewise turned on, the opaque carrier 8 will absorb that light and be heated to some extent. That light is modified by the diaphragm 8 and the control loop 14 to 17 operates to keep the temperature of carrier 8 constant at a tolerance of below 1/100° C. This exceptional accuracy is needed in order to be able to detect small, local temperature differences of and in the object on carrier 8. The object and the liquid crystal layer in the carrier must be in intimate heat-conductive contact so that any local change in the temperature of the object is locally effective as a change in reflectivity of the liquid crystal. That local change is picked up by the camera 6; it is not "seen" by detector 15, except to the extent that such local change affects the average reflectivity of the crystal layer.

Figure 2:
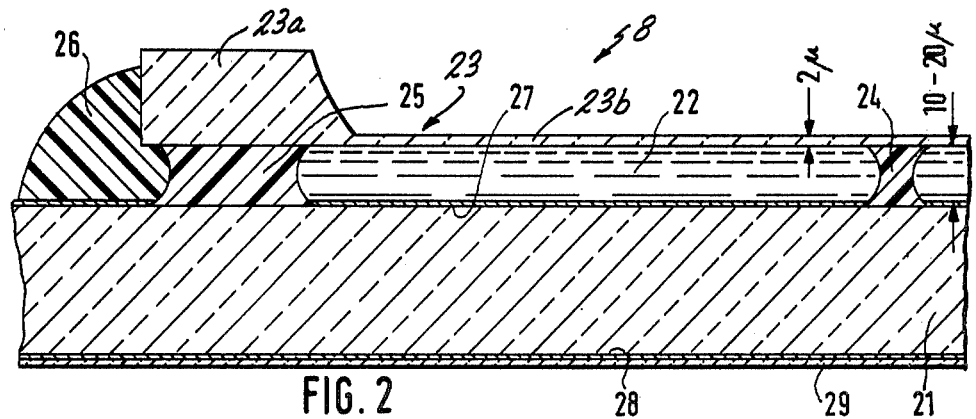
FIG. 2 is a section view of an object carrier in accordance with the principal feature of the present invention.

The object carrier, being the principal element for practicing the invention, is shown in greater detail in FIG. 2. The carrier includes a transparent carrier plate 21, carrying a liquid crystal layer 22 which is covered by a likewise transparent cover plate 23. The liquid crystal material of layer 22 most suitable, e.g., for microbiological investigations is made of cholesterin or of esteric or mesomorphic compounds. The cover plate 23 is particularly mounted on spacers such as 24 and edge elements such as 25. The spacer and edge elements may have been vapor-deposited on plate 21. The spacer et cetera elements 24 and 25 are required also to establish and maintain an accurate thickness for layer 22, over the entire surface of this carrier. The outer edge portion and boundary of edge spacer 25 and the edge 23a of plate 23 is sealed by and in a suitable material 26.

The glass plate 21 may have a thickness of about 1 mm, the liquid crystal layer has a thickness in the order of 10 to 20 micrometers. The edge portion 23a of cover 23 is thicker than the central and main part, 23b, the latter having a thickness, particularly above the liquid crystal layer, of about 2 micrometers. This thin portion may have resulted from etching a plate having originally the thickness of the edge part 23a. The object to be carried (e.g., a microorganism) lies on that thin, central part 23b to, thereby, be placed in close proximity to the crystal layer 22. Any local temperature change is quickly transmitted via the 2-micrometer "heat bridge" into the layer 22 whose reflectivity is, thus, locally changed.

The two sides (flat surfaces) of plate 21 carry, i.e., as deposited with antireflective layers 27 and 28, respectively. The back of the carrier, i.e. layer 28, is additionally provided with an absorption layer 29 which converts radiation (light) impinging upon it into heat.

In operation, referred to generally above, such a carrier 8 is placed into the path of light directed from source 12. On the other hand, the detector 15 observes substantially the entire field of view of the object carrier and, thus, ascertains the average temperature of that carrier in the following manner. Light from source 9 and as directed onto the carrier 8 by the semireflector 11 is reflected back by the liquid crystal layer towards the detector 15. The reflected light particularly passes through elements 2 and 3, and the edge filter 16 is selected so that the steep absorption edge of that filter coincides with the most sensitive area of the liquid crystal in carrier 8. That steep edge of the filter is used for control. Changes in temperature in that liquid crystal layer change the optical input of detector 15 and control the diaphragm 18. The diaphragm is operated in that a temperature increase is used to close the diaphragm a little to reduce the radiation heating of the carrier by the light from source 12. The illumination of the absorbing layer 29 as well as the thickness of that layer should be very uniform so that the heating of plate 21 in this manner is uniform, indeed.

It can thus be seen that the regular heated table 17 in the microscope keeps the temperature at a ±0.1-degree accuracy or, possibly, better. The control loop as described improves that accuracy to better than $10^{-2}$ centigrades. This means that minute, local temperature differences in the order of better than $10^{-2}$ centigrades at distances of less than 1 micrometer can be detected by selective reflection. Also, the temperature profile in time of a particular cell, et cetera, can be tracked by a recording device (motion picture, and so forth).

Figure 3A:
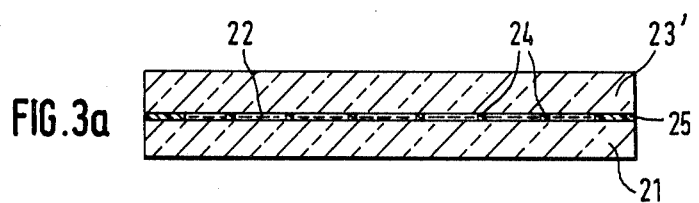
FIGS. 3a to 3d illustrate the various stages of making such an object carrier.
Figure 3B:
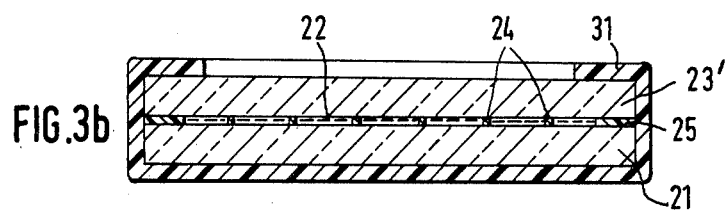

FIGS. 3a through 3d illustrate schematically the formation of the carrier, particularly of the cover 23 thereof as made by chemical milling. FIG. 3a depicts the carrier plate 21 with edge and spacer elements 24 and 25 and a liquid crystal material in between. A cover 23' is placed on top of the elements 24 and 25 and secured thereto. Next (FIG. 3b) a masking layer of lacquer, or the like, 31, is placed onto the back and the sides of this assembly covering also that portion of plate 23' which will become edge or rim 23a. This layer 31 protects the assembly from an etching solution which is now being applied.

Figure 3C:
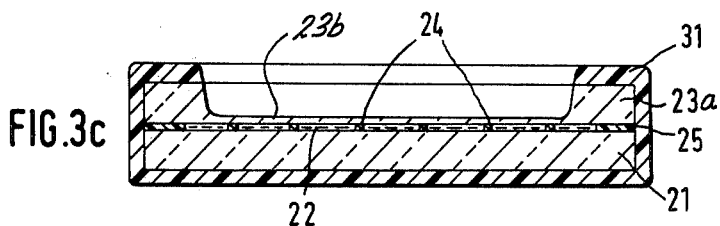
Figure 3D:
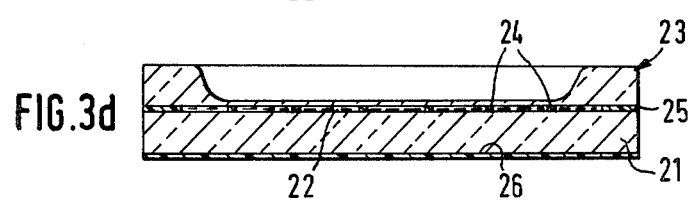

The plate 23' may be etched, for example, by a fluor-containing liquid, thinning the plate 23' to the desired thickness of 2 micrometers (FIG. 3c). In order to obtain a uniform thickness of that portion 23b, it is necessary to provide a relative motion between plate 23' and the etching solution. Upon completion of etching, the protective masking layer 31 is removed, and the back of plate 21 is now provided with the antireflex layer 28 and the light-absorbing, opaque layer 29. It was found that one can, indeed, keep the temperature of an object on plate 23 constant at an accuracy of $10^{-3}$-degree centigrades.

The invention is not limited to the embodiments described above; but all changes and modifications thereof, not constituting departures from the spirit and scope of the invention, are intended to be included.

We claim:

1. An object carrier for use in equipment measuring local temperature differences, comprising:
   a first carrier plate;
   a liquid crystal layer on the first carrier; and
   a second plate on the crystal layer having a thickness of a few micrometers, being considerably less than the thickness of the liquid crystal layer.

2. An object carrier as in claim 1, the first plate carrying an opaque, heat-absorbing layer.

3. An object carrier as in claim 2, the absorbing layer being on a surface of the plate opposite a surface.

4. A method for measuring local temperature differences, using an object carrier as set forth in claim 1.

5. In a method of measuring local temperature differences of an object under utilization of a microscope including a source of radiation for illuminating such an object, the improvement comprising:
   the step of using an object carrier having a very thin transparent plate and means for maintaining a thin, liquid crystal layer underneath the plate, the layer being substantially thicker than the plate, the layer changing its reflectivity with temperature including temperature changes of the object on the plate.

6. In a method as in claim 5, including the step of separately measuring the average reflection of the crystal layer in representation of the average temperature of the object, and controlling the application of thermal energy to the carrier for stabilizing its temperature.

7. In a method as in claim 5, including the step of using radiation energy for said application, the object carrier having an absorption layer.

8. In an apparatus for measuring minute, local temperature differences in an object, the apparatus including lens means establishing a microscope, further including illumination means for an object, and means for supporting in an optical path that includes the lens means and in illuminating relation to the illuminating means, the improvement of an object carrier on the supporting means, the carrier including a liquid crystal layer and means for retaining the layer, being thinner than the crystal layer, the object being accordingly supported on the carrier in close proximity to the crystal layer.

9. In an apparatus as in claim 8, the means for supporting including heating means.

10. In an apparatus as in claim 8 or 9, and including means disposed for detecting the reflection of light from the liquid crystal and including means for heating the carrier, controlled by the means for detecting, in order to maintain the temperature of the carrier constant.

11. An apparatus as in claim 10, the means for heating being a source of radiation, the carrier including a radiation-absorbing layer, the source of radiation being disposed for irradiating said absorbing layer.

12. An apparatus as in claim 11, the source of radiation being a constant source, there being a controllable diaphragm disposed to vary the irradiating in response to said detecting.

13. An object carrier as in claim 8, being constructed as set forth in claim 1.

14. An object carrier as in claim 1 or 13, the first carrier plate being transparent, having an antireflex layer on at least one of its sides.

15. An object carrier as in claim 14, the second plate being a transparent plate having a thick edge, and a central portion being thinned by chemical milling.

16. An object carrier as in claim 14, the first plate carrying a light-absorbing layer on a surface opposite a surface adjacent to which is disposed the liquid crystal layer.

* * * * *